Oct. 27, 1936.  C. W. LAMPSON  2,059,001
SYSTEM OF ELECTRICAL DISTRIBUTION
Original Filed Feb. 10, 1933
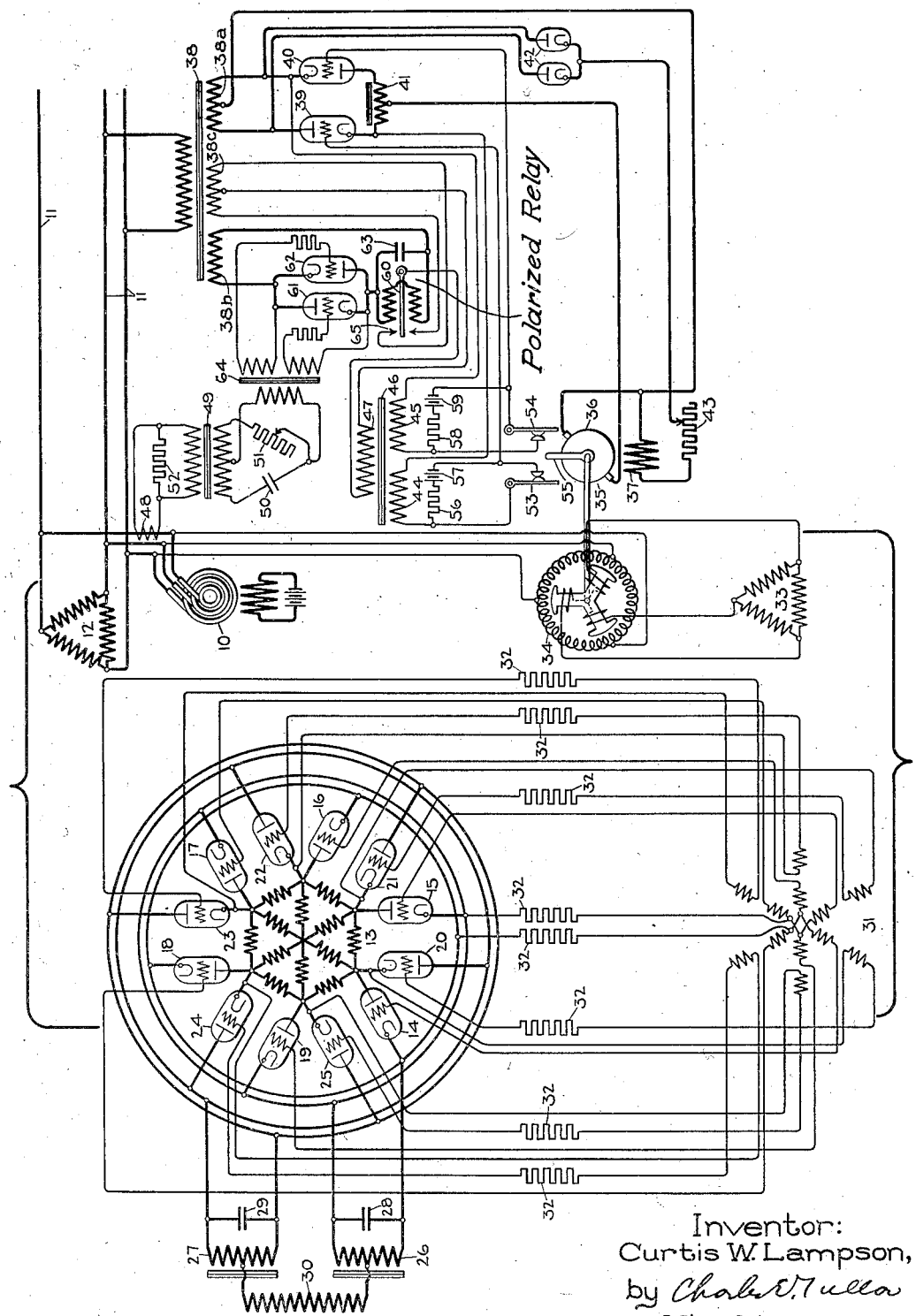
Inventor:
Curtis W. Lampson,
by *Chas. W. Tulla*
His Attorney.

Patented Oct. 27, 1936

2,059,001

UNITED STATES PATENT OFFICE 2,059,001

SYSTEM OF ELECTRICAL DISTRIBUTION

Curtis W. Lampson, Pittsfield, Mass., assignor to General Electric Company, a corporation of New York Application February 10, 1933, Serial No. 656,132
Renewed September 7, 1935

14 Claims. (Cl. 172—246)

My invention relates to systems of electrical distribution and more particularly to such systems including an electric valve converting apparatus arranged to carry a variable amount of wattless current to control an electrical condition of the system.

In the operation of a system of electrical distribution including an alternating current circuit, it has been found that any of several electrical conditions of the system may be satisfactorily controlled by controlling the amount of wattless current delivered to or by the alternating current circuit. For example, in the case of a system of distribution for transmitting energy from a synchronous generating station to an alternating current load circuit, the rating of the synchronous generating equipment may be utilized to the maximum extent by supplying any wattless current required by the connected load from an auxiliary equipment. Such an equipment may also be an effective means for controlling the voltage or other electrical condition of the system. Although in the arrangements of the prior art the auxiliary equipment usually takes the form of a synchronous reactance, that is, a synchronous machine floating on the line, it has heretofore been proposed to substitute for such a synchronous reactance, an electric valve converting apparatus operating at or near zero power factor leading or lagging. Such an electric valve converting apparatus is disclosed and claimed in United States Letters Patent No. 2,036,843, granted April 7, 1936, upon the copending application of C. H. Willis. My invention relates in general to a system of this type and more particularly to such a system including means for varying the wattless current carried by the converting apparatus to regulate an electrical condition of the system.

It is an object of my invention, therefore, to provide an improved system of electrical distribution including an alternating current circuit and an electric valve converting apparatus for exchanging wattless current with the alternating current circuit in which the exchange of wattless current is controlled to regulate an electrical condition of the system.

It is a further object of my invention to provide an improved system of electrical distribution including an alternating current circuit and an electric valve converting apparatus for exchanging wattless current with the alternating current circuit in which the amount of wattless current exchanged is varied to maintain a constant power factor on the alternating current circuit.

It is a further object of my invention to provide an improved system of electrical distribution including an alternating current circuit and an electric valve converting apparatus for exchanging wattless current therewith in which the amount of wattless current exchanged is varied to regulate an electrical condition of the system, and in which the amount of circulating current is limited to a predetermined value.

In accordance with one embodiment of my invention, an electric valve converting apparatus is connected to an electrical distribution system comprising a synchronous generator and an alternating current load circuit. The electric valve converting apparatus may be any of the several types well known in the art capable of operating at or near zero power factor, either lagging or leading, such for example, as the apparatus disclosed and claimed in United States Letters Patent No. 1,929,721 granted October 10, 1933, upon a copending application of C. H. Willis. The grids of the valves of the converting apparatus are excited from the alternating current circuit through a phase shifting means, such as a rotary phase shifting transformer. There is provided an actuating mechanism for operating the phase shifting means and this actuating mechanism is controlled through a pair of oppositely connected electric valves responsive to the phase relation between the current and voltage of the alternating current circuit. If desired, phase adjusting means may be included in the control circuit of the electric valves. Limit switches are preferably associated with the actuating mechanism in order to limit the variation of the phase of the grid potentials of the valve converting apparatus to values corresponding to rated load on the apparatus. With such an arrangement, a departure of the power factor on the alternating current circuit from the value for which the phase adjusting means is set will render one or the other of the electric valves conductive to energize the actuating mechanism and to shift the phase of the grid potentials of the valve converting apparatus. With such an arrangement the converting apparatus will normally exchange a substantially wattless leading current with the alternating current circuit and the magnitude of this wattless current may be varied by shifting the phase of the grid potentials slightly from the quadrature position.

For a better understanding of my invention, together with other and further objects thereof, reference is had to the following description taken in connection with the accompanying drawing and its scope will be pointed out in the appended claims. The single figure of the drawing illustrates an arrangement for maintaining substantially constant power factor on a three-phase alternating current circuit.

Referring now more particularly to the drawing, there is illustrated a system of electrical distribution including a three-phase synchronous generator 10 connected to supply a three-phase alternating current load circuit 11. To the circuit 11 is connected an electric valve converting apparatus including a three-phase primary network 12 connected to the circuit 11 and a six-phase secondary network 13. To the several phase terminals of the network 13 are connected a group of electric valves 14–19, inc., connected with such a polarity as to conduct current away from the network, which may be conveniently referred to as positive valves, and a group of electric valves 20–25, inc., connected with such a polarity as to conduct current to the network, which may be referred to conveniently as negative valves.

Electric valves 14–25, inc., are each provided with an anode, a cathode, and a control grid, and may be of any of several types well known in the art, although I prefer to use valves of the vapor electric discharge type. The cathodes of alternate positive electric valves are connected together into groups, and these two groups are interconnected through opposite halves of a commutating winding 26. Similarly, the anodes of alternate negative electric valves are connected together through opposite halves of the commutating winding 27. Commutating capacitors 28 and 29 are connected across the windings 26 and 27, respectively, and the electrical midpoints of these windings are interconnected through a reactance device 30.

In order to control the conductivities of the several electric valves 14–25, inc., and thus the magnitude of the current transmitted by the converting apparatus, the grids of the several electric valves are connected to their respective cathodes through secondary windings of the proper phase relation of the secondary network 31 of a grid transformer and current limiting resistors 32. The primary winding 33 of the grid transformer is energized from the alternating current circuit 11 through any suitable phase shifting means, such for example, as a rotary phase shifting transformer 34. The grid transformer comprising the networks 31 and 33 is preferably of the self-saturating type, or a self-saturating transformer should be interposed in the connections between the phase windings of the network 31 and the grids of the several electric valves to convert the sinusoidal alternating potential of the circuit 11 into one of peaked wave form for exciting the grids of the several electric valves, as is well understood by those skilled in the art. However, it will be apparent that the above described converting apparatus which is disclosed and claimed in the aforementioned Patent No. 2,036,843, is merely illustrative and that any other type of electric valve converting apparatus capable of operating at low power factor may be substituted therefor without departing from my invention.

In order to control the current exchanged between the converting apparatus and the alternating current circuit 11 to regulate an electrical condition of the circuit 11, as for example, its power factor, the rotary phase shifting transformer 34 is connected to be operated by a reversible motor 35 provided with an armature 36 and field winding 37. The armature 36 may be selectively energized with either polarity by means of a pair of rectifying circuits connected thereto with opposite polarities and comprising, respectively, the left-hand portion of the secondary winding 38a of a transformer 38, the primary winding of which is energized from the circuit 11, and an electric valve 39; and the right-hand portion of the secondary winding 38a and an electric valve 40. An inductive winding 41 may be interposed in the connections between the electric valves 39 and 40 and provided with an electrical midpoint connected to one terminal of the armature 36 in order to limit any short-circuit current, in case the electric valves 39 and 40 should become conductive simultaneously, and to smooth out the ripples in the current supplied to the motor 35. The field winding 37 of the motor 35 may be energized from any suitable source of direct current, such for example, as an auxiliary rectifier comprising the secondary winding of the transformer 38 and a pair of electric valves 42 connected in a conventional manner to secure full wave rectification. A variable resistor 43 may be included in the field circuit if desired.

The grids of electric valves 39 and 40 are connected to be excited with an alternating potential variable in polarity in accordance with variations in phase of the alternating current of the circuit 11. For example, the grids of the valves 39 and 40 are connected to be energized from independent secondary windings 44 and 45, respectively, of a grid transformer 46, the primary winding 47 of which is energized with an alternating potential of a polarity dependent upon the phase relation of the current delivered by machine 10. In order to produce this potential variable in polarity in accordance with the phase of the current delivered by the alternating current machine 10, there is provided a current transformer 48 interposed in the connection between the machine 10 and the alternating current circuit 11, and a phase-shifting network connected across the current transformer 48 comprising a transformer 49 and a capacitor 50 and variable resistor 51 serially connected across the secondary winding of the transformer 49. A resistor 52 is preferably connected across the current transformer 48 to limit the voltage thereof to a safe value. There is also provided a polarized relay 60, the windings of which are energized from a secondary winding 38b of the transformer 38 through a pair of electric valves 61 and 62 reversely connected in parallel. The valves 61 and 62 are preferably of the three electrode high vacuum pure electron discharge type. A smoothing condenser 63 may be connected in parallel to the windings of the polarized relay 60, as illustrated, to by-pass any alternating component of current. The grids of electric valves 61 and 62 are connected to be excited from independent secondary windings of a control transformer 64, the primary winding of which is energized from the output of the impedance phase shifting circuit; that is, it is connected between the electrical midpoint of the secondary winding of transformer 49 and the junction between capacitor 50 and resistor 51. The primary winding 47 of the transformer 46 which controls the electric valves 39 and 40, and thus the direction of rotation of the motor 35, may be selectively energized with either polarity from the secondary winding 38c of the transformer 38 through the contacts 65 of polarized relay 60.

Interposed in the connections between the windings 44 and 45 and the grids of the valves 39 and 40 are limit switches 53 and 54, respectively, adapted to be opened by a member 55 mounted on the motor 35. Connected in parallel with the contacts of the switch 53 are a resistor 56 and a negative bias battery 57. Similarly, a resistor 58 and negative bias battery 59 are serially connected across the contacts of the switch 54. The switches 53 and 54 are thus effective, upon their operation, to impress negative grid potentials upon the grids of their associated valves and limit the operation of the motor 35 and the rotary phase shifting transformer 34 to a position corresponding to the maximum current rating of the electric valve converting apparatus.

The general principles of operation of the above described valve converting apparatus per se will be well understood by those skilled in the art, or may be found explained in detail in the above-mentioned applications of C. H. Willis. In brief, if electric valves 14 and 23 are initially rendered conductive, current will flow from the network 13 through electric valve 14, the lower portion of the commutating winding 26, inductive winding 30, the lower portion of commutating winding 27, and electric valve 23, back to the network 13. This current, flowing in inductive windings 26 and 27 induces a potential across capacitors 28 and 29 the magnitude of which depends upon the value of the current, since these capacitors are effectively in series therewith. If the phase rotation of the network 13 is counterclockwise, sixty electrical degrees later, when electric valves 15 and 24 are rendered conductive, the potential of the capacitor 28, which is connected directly between the cathodes of the valves 14 and 15, is effective to transfer the current between these valves even though it is desired to effect this commutation at a point in the cycle of alternating potential when the electromotive force of the network 13 opposes such commutation. Similarly, the potential of capacitor 29 is effective to transfer current from electric valve 23 to electric valve 24. The current now reverses in the windings 26 and 27 and, during the next sixty electrical degrees, will reverse the polarity of the potential on the capacitors 28 and 29 so that these capacitors will be effective to transfer the current from the conductive valves to the next successive valves. In this manner current is successively commutated between the several electric valves.

It is well understood by those skilled in the art that the energy transmitted by such a converting apparatus may be controlled by adjusting the phase of the grid potentials of the several electric valves. In view of the fact that the direct current circuit of the above apparatus is directly short-circuited through the reactance device 30, the energy component supplied by the network 13 will, evidently, be entirely consumed in overcoming the losses within the apparatus. Hence, the rotary phase shifting transformer 34 must be adjusted so that the grid potentials of the several electric valves are substantially in quadrature with their anode potentials as supplied from the alternating current circuit 11. If the grid potentials are exactly in quadrature, obviously no current flows in the apparatus, but if they are adjusted a few degrees on either side of quadrature leading or lagging, a substantially wattless current will be exchanged between the converting apparatus and the circuit 11 and, over the limited range of operation for which such an arrangement is suitable, the phase of this current will remain substantially constant and in quadrature and the magnitude will vary approximately directly with the magnitude of the phase displacement of the grid potentials from quadrature. The current flowing in the converting apparatus under such conditions is substantially solely wattless current, the only energy component, as stated above, being that required to overcome the losses in the apparatus.

The above described operation is to be distinguished from the operation of an electric valve converting apparatus interconnecting a direct current power circuit and an alternating current circuit in which the relative voltages of the direct and alternating current circuits are varied by varying the phase of the grid excitation of the electric valves. In such an arrangement, the normal operation of the apparatus contemplates a variation of the phase of the grid potentials through substantially ninety electrical degrees, the variations in the power factor of the current transmitted by the apparatus being incidental to and dependent upon the ratio of the voltages of the circuit. In other words, the variations of the power factor on the alternating current circuit depend primarily upon the variation in phase of the current transmitted by the apparatus, and secondarily upon the magnitude of the current, which in turn, is determined by the energy demands of the load circuit.

The manner in which the above described apparatus operates to maintain a constant power factor on the circuit 11 is as follows: Assume that the load on the alternating current circuit 11 is of lagging power factor and that the motor 35 is in the position illustrated, which position corresponds to the position of the rotary phase shifting transformer 34 to impress grid potentials on the valves of the valve converting apparatus slightly less than quadrature leading with respect to the potential of the alternating current circuit 11. Under these conditions, with a lagging load on the alternating current circuit 11 and with the phase adjusting means comprising the transformer 49, capacitor 50, and resistor 51 adjusted to maintain unity power factor on the alternating current circuit 11, the phase of the grid potentials of the valves 14–25, inc., is such as to produce a small voltage in the direct current circuit including the reactance device 30, and this voltage is effective to circulate a current through the apparatus, the voltage being completely consumed by the impedance drop of the apparatus. The magnitude of the current circulated will, over the limited range of operation, be roughly proportional to the displacement of the grid potentials from quadrature. This leading current drawn through the electric valve converting apparatus from the alternating current circuit 11 will tend to compensate for the lagging current drawn by the load and maintain substantially unity power factor on the generator 10.

Under the conditions assumed in the preceding paragraph, the potentials impressed upon the grids of electric valves 61 and 62 from the control transformer 64 will be substantially in quadrature leading with respect to the anode potential of one valve and in quadrature lagging with respect to the anode potential of the other valve. The valves 61 and 62 thus pass equal amounts of current during their respective half cycles of positive anode potential and these impulses, being equal and opposite, have no unidirectional component and no effect upon the polarized relay 60. Thus, the primary winding 47 of the transformer 46 is deenergized and neither of the grids of the electric valves 39 or 40 are energized to supply current to the armature 36 of the motor 35. If now, the wattless current drawn by the circuit 11 should increase, the power factor of the circuit 11, and with it that energy delivered by the alternating current machine 10, would decrease, and the potential impressed upon the grids of the electric valves 61 and 62 from the current transformer 48 through the phase-shifting circuit would be retarded in phase. The grid potential of one of the electric valves, for example the valve 61, now lags its anode potential by substantially more than ninety electrical degrees, thus decreasing the average current transmitted by it, while the grid potential of the other electric valve now leads its anode potential by less than ninety electrical degrees, thus increasing the average current transmitted by this valve. The result will be that a unidirectional component of current is passed through the windings of the polarized relay 60 which will operate its armature to close one of its contacts 65 and energize the primary winding 47 of the grid transformer 46 with a predetermined polarity. Grid potentials are thus impressed upon the grids of the valves 39 and 40 which are in phase with the anode potential of one of the valves and in phase opposition with the anode potential of the other valve. For example, it may be assumed that the potential impressed upon the grid of the valve 39 is in phase with its anode potential so that the left-hand portion of the winding 38a and the electric valve 39 act as a half wave rectifier supplying current to the armature 36 of the motor 35. The motor 35 now operates to rotate the rotary phase-shifting transformer 34 slightly to advance the potentials impressed upon the grids of the valves 14–25, inc., and thus increase the magnitude of the leading current drawn by the converting apparatus to compensate for the increased lagging load drawn by the circuit 11 thus maintain unity power factor on the machine 10.

Under the foregoing conditions, the potentials of the grids of the electric valves 61 and 62 are again returned to quadrature position so that no unidirectional component of current is passed by these two valves, the polarized relay 60 is deenergized and the motor 35 remains stationary in the new position corresponding to the increased lagging current drawn from the load circuit 11. Subsequent increases in the lagging current drawn from the alternating current circuit 11 by the connected load will cause successive operations of the motor 35 to increase the leading wattless current drawn by the electric valve converting apparatus. Obviously, should the lagging current drawn from the circuit 11 subsequently decrease, the reverse operation will take place, that is, the average current transmitted by the electric valve 61 will exceed that passed by electric valve 62, the polarized relay 60 will close its opposite contacts to energize the primary winding 47 of the transformer 46 with an opposite polarity, electric valve 39 will become non-conductive, while electric valve 40 will be rendered conductive to cause the motor 35 to rotate in an opposite direction and to decrease the leading current drawn by the electric valve converting apparatus. Obviously, if it should be desired to utilize the above described apparatus to control the power factor on a system with a leading power factor load, the rotary phase shifting transformer 34 will initially be adjusted to supply grid potentials to the valves of the converting apparatus substantially in quadrature lagging so that the converting apparatus will draw lagging current from the system to compensate for the leading current of the load.

In view of the fact that the direct current circuit of the converting apparatus is short-circuited through the reactance device 30, if the phase of the grid potentials of the several electric valves should even approach the phase of their anode potentials, destructive currents might be set up in the apparatus. In order to prevent such a result, the limit switches 53 and 54 are effective, upon the operation of the motor 35 and rotary phase shifting transformer 34 to a position corresponding to a safe value of current in the valve converting apparatus, to interpose current limiting resistor 56 and negative bias battery 57 in the grid circuit of electric valve 39 and current limiting resistor 58 and negative bias battery 59 in the grid circuit of electric valve 40 to maintain these valves non-conductive and thus to prevent further variation in the phase of the grid potentials applied to the electric valve converting apparatus.

While I have described an arrangement for maintaining constant power factor on an alternating current circuit, it will be apparent to those skilled in the art that the wattless current exchanged between the valve converting apparatus and the alternating current circuit may be regulated to control the voltage or any other electrical condition of the alternating current system.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:—

1. In a system of electrical distribution, an alternating current circuit, an electric valve converting apparatus consisting of non-rotatable elements and connected to said alternating current circuit and controlled to exchange substantially solely wattless current therewith, and means responsive to an electrical condition of said system for controlling the wattless current exchanged between said converting apparatus and said alternating current circuit.

2. In a system of electrical distribution, an alternating current circuit, an electric valve converting apparatus consisting of non-rotatable elements and connected to said alternating current circuit for transmitting substantially solely wattless current thereto, and means responsive to an electrical condition of said system for controlling the power factor of the current transmitted by said valve converting apparatus.

3. In a system of electrical distribution, a source of alternating current, a load circuit connected thereto, an electric valve rectifying apparatus consisting of non-rotatable elements energized from said source and controlled to exchange substantially solely wattless current therewith, and means responsive to an electrical condition of said load circuit for controlling the power factor of the current transmitted by said valve rectifying apparatus.

4. In a system of electrical distribution, a source of alternating current, a load circuit connected thereto, apparatus consisting of non-rotatable elements energized from said source and comprising a plurality of grid controlled electric valve converting means, means for impressing periodic potentials on the grids of said valves to control their conductivities, and means responsive to the power factor of the current drawn by said load for varying the phase of said grid potentials.

5. In a system of electrical distribution, an alternating current source and circuit, an electric valve rectifying apparatus consisting of non-rotatable elements and connected to said alternating current circuit and including a plurality of grid controlled electric valves, means for exciting the grids of said valves with periodic potentials substantially in quadrature with the potential of said source, whereby said rectifying apparatus acts substantially as a synchronous reactance, and means responsive to an electrical condition of said system for controlling said grid excitation means.

6. In a system of electrical distribution, a source of alternating current, a load circuit connected thereto, an electric valve rectifying apparatus consisting of non-rotatable elements energized from said source and including a plurality of grid controlled electric valves, an inductance device, the direct current circuit of said rectifying apparatus being closed through said inductance, means for exciting the grids of said valves with periodic potentials substantially in quadrature with the potential of said source, whereby said rectifying apparatus acts substantially as a synchronous reactance, and means responsive to the power factor of said load circuit for controlling the wattless current drawn by said rectifying apparatus to maintain constant the power factor of the current drawn from said source.

7. In a system of electrical distribution, an alternating current circuit, an electric valve rectifying apparatus consisting of non-rotatable elements energized from said alternating current circuit and comprising a direct current circuit, a polyphase inductive network, a plurality of grid controlled electric valves interconnecting said direct and alternating current apparatus through said network, means for introducing into said rectifying apparatus an alternating potential of a frequency equal to a multiple of that of said alternating current circuit to commutate the current between said valves under any power factor conditions on said alternating current circuit, means for exciting the grids of said valves with alternating potentials substantially in quadrature with that of said alternating current circuit whereby said rectifying apparatus operates substantially as a synchronous reactance, and means responsive to an electrical condition of said system for controlling the wattless current drawn by said rectifying apparatus.

8. In a system of electrical distribution, an alternating current circuit, an electric valve converting apparatus connected to said alternating current circuit and including a plurality of grid controlled electric valves, phase shifting means for energizing the grids of said valves from said alternating current circuit, and an electric valve responsive to the phase relation between the current and voltage of said alterating current circuit for controlling said phase shifting means.

9. In a system of electrical distribution, an alternating current circuit, an electric valve converting apparatus connected to said alternating current circuit and including a plurality of grid controlled electric valves, phase shifting means for energizing the grids of said valves from said alternating current circuit, an actuating mechanism for operating said phase shifting means, and an electric valve responsive to the phase relation between the current and voltage of said alternating current circuit for controlling the operation of said mechanism.

10. In a system of electrical distribution, an alternating current circuit, an electric valve converting apparatus connected to said alternating current circuit and including a plurality of grid controlled electric valves, phase shifting means for energizing the grids of said valves from said alternating current circuit, an actuating mechanism for operating said phase shifting means, an electric valve provided with an anode and a control grid, one of the electrodes of said valve being energized in accordance with the voltage of said alternating current circuit and the other of the electrodes of said valve being energized in accordance with the current thereof, said valve being effective to control the operation of said actuating mechanism.

11. In a system of electrical distribution, an alternating current circuit, an electric valve converting apparatus connected to said alternating current circuit and including a plurality of grid controlled electric valves, phase shifting means for energizing the grids of said valves from said alternating current circuit, an actuating mechanism for operating said phase shifting means, an electric valve provided with anode and grid electrodes, one of said electrodes being energized in accordance with the voltage of said alternating current circuit and the other being energized in accordance with the current thereof, said valve being effective to control the operation of said actuating mechanism, and phase adjusting means included in one of the energizing circuits of said valve.

12. In a system of electrical distribution, an alternating current circuit, an electric valve converting apparatus connected to said alternating current circuit and including a plurality of grid controlled electric valves, phase shifting means for energizing the grids of said valves from said alternating current circuit, an actuating mechanism for operating said phase shifting means, an electric valve responsive to the phase relation between the current and voltage of said alternating current circuit for controlling the operation of said mechanism, and means for maintaining the operation of said mechanism within predetermined limits.

13. In a system of electrical distribution, an alternating current circuit, an electric valve converting apparatus connected to said alternating current circuit and including a plurality of grid controlled electric valves, phase shifting means for energizing the grids of said valves from said alternating current circuit, a reversible actuating mechanism for operating said phase shifting means, a pair of electric valves responsive to the phase relation between the current and voltage of said alternating current circuit, each valve being effective to control the operation of said mechanism in one direction, and means for limiting the operation of said mechanism in either direction.

14. In a system of electrical distribution, an alternating current circuit, an electric valve converting apparatus connected to said alternating current circuit and including a plurality of grid controlled electric valves, a rotary phase shifting transformer for energizing the grids of said valves from said alternating current circuit, a reversible motor for operating said rotary transformer, a pair of grid controlled electric valves, each provided with anode and grid electrodes, one of said electrodes of each of said pair of valves being energized in accordance with the voltage of said alternating current circuit and the other being energized in accordance with the current thereof, the grid and anode voltages of said valves being of relative opposite polarity, phase adjusting means included in one of the energizing circuits of said pair of valves, a winding for said motor, a second pair of oppositely connected electric valves controlled by said first pair of valves and connected to selectively energize said motor winding with either polarity, and a pair of limit switches operated by said motor, each effective to render non-conductive one of said second pair of valves to deenergize said motor winding.

CURTIS W. LAMPSON.